United States Patent

[11] 3,563,156

[72] Inventor Albert Oreste Del Gamba
201-203, bld. de la Madeine, Nice, France
[21] Appl. No. 798,661
[22] Filed Feb. 12, 1969
[45] Patented Feb. 16, 1971
[32] Priority Feb. 16, 1968, Oct. 15, 1968
[33] France
[31] PV9028 and PV9451

[54] FILTERING APPARATUS CONTAINING VEGETABLE FIBRES
5 Claims, 4 Drawing Figs.

[52] U.S. Cl. ............................................. 99/277.1,
210/263
[51] Int. Cl. ............................................. A12h 1/22
[50] Field of Search ................................... 99/277.1,
277.2, 277, 35, 48; 204/194; 210/261, 262, 263, 505

[56] References Cited
UNITED STATES PATENTS
161,642  4/1875  Spier ............................. 99/48
205,443  6/1878  Thierman ........................ 99/48
630,870  8/1899  Driesbach ....................... 210/261X
1,052,440  2/1913  Hagg ............................. 210/261X
1,752,060  3/1930  Burright et al. ................. 210/261

*Primary Examiner*—Billy J. Wilhite
*Assistant Examiner*—Arthur O. Henderson
*Attorney*—McGlew and Toren ABSTRACT: An arrangement for protecting the filtering fibers inside a wine-treating vat to protect it against premature soiling, said arrangement comprising a preliminary filter constituted by a small mass of filtering fibers filling a short tubular upright rising above the conventional opening in the upper cover of the vat which is assumed to be completely filled with filtering fibers. The small prefiltering mass of fibers carried for instance by a basket removably fitted inside the upright can be readily replaced. This ensures a much longer life for the actual large filtering mass of fibers inside the vat. An annular wall may surround the tubular upright and rise above the latter so that the wine poured into the annular gap between the upright and the wall may flow thence over the edge of the upright into the latter and into the vat.

PATENTED FEB 16 1971 3,563,156

INVENTOR.
ALBERT ORESTE DEL GAMBA
BY *McGlew & Toren*

ATTORNEYS

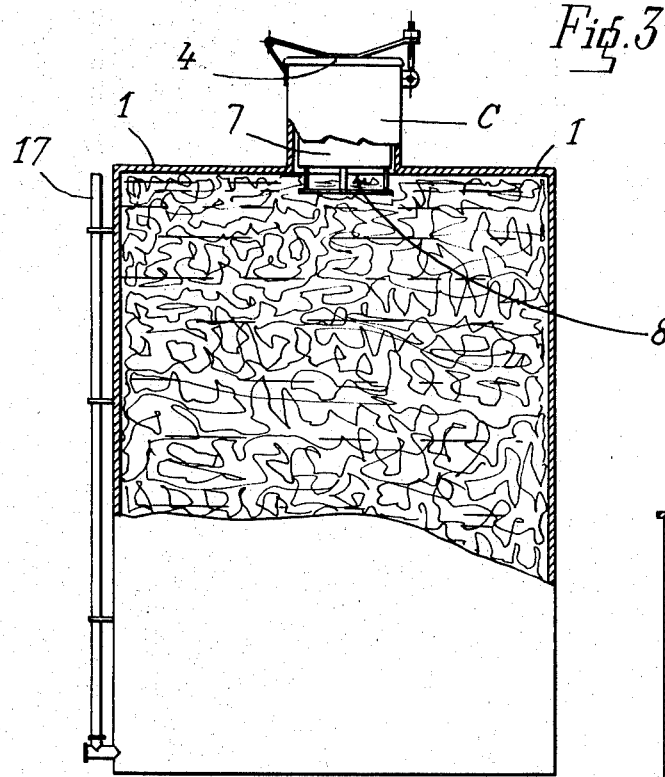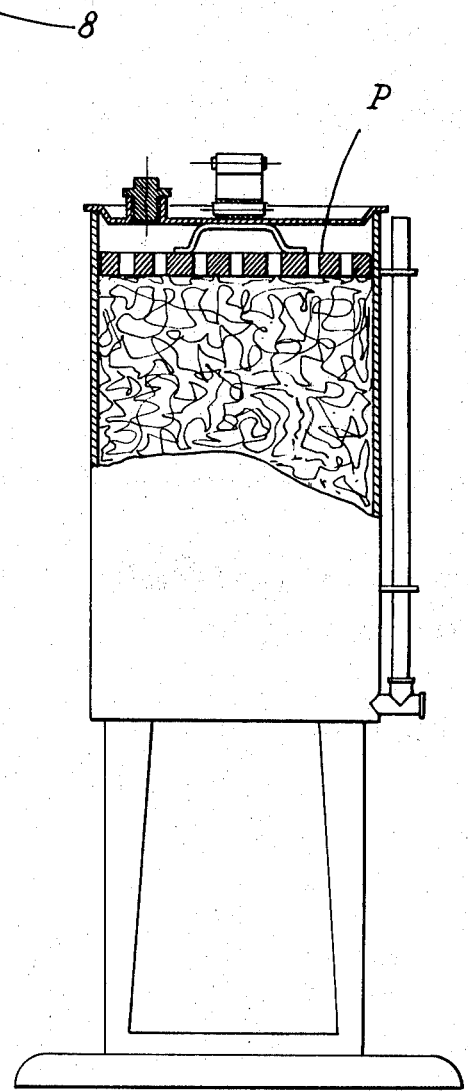

FILTERING APPARATUS CONTAINING VEGETABLE FIBRES

The present invention has for its object an apparatus for filtering wine by means of vegetable fibers such as those constituted by selected and treated wood shavings, said fibers being compressed in a vat within which the wine is to stay at least during 24 hours before it is drawn out, whereby the wine assumes a perfect limpidity and a highly brilliant, natural and finished appearance without the slightest objectionable taste.

Sine the amount of wine drawn out each time is proportional to the volume of the fibrous filtering means it will be readily understood that there is a considerable interest, in the case of a vat system operating on a commercial scale, in designing each vat in a manner such that it may be completely filled with the filtering means substantially up to 100 percent of its capacity.

On the other hand, it is essential for the wine undergoing treatment to be protected against any contact with air, which would detrimentally affect its grade and alter its appearance.

My invention has for its object an appliance to be incorporated with a vat and which satisfies all the conditions and furthers the treatment, while it provides furthermore a substantial economy in the renewal of the fibers when they have become unfit for further filtration as a consequence of the dregs which have settled in the vat.

My invention consists chiefly in capping the vat with a short tubular upright enclosing a small removable filter filled preferably also with vegetable fibers and through which the wine is caused to flow before it drops into the actual vat. Said upright thus forming or containing a small filter may be surrounded by a cylindrical chimney which is higher than said upright and which is welded to the upper cover of the vat so that the wine to be treated may be poured into the annular gap separating the chimney from the upright forming a preliminary filter for the wine, so that it begins rising in said annular gap and then flows over into the upright forming the preliminary filter and thence into the vat; this being done, the chimney filled with wine is closed fluidtightly by a cover while the vat is completely closed off against the small amount of air which may remain underneath said cover as provided by the actual wine-impregnated filtering mass forming the preliminary filter.

On the other hand, the preliminary filter frees the wine, before it enters the main filter filling completely the vat, of its chief impurities. Thus the main filter is protected against a too speedy soiling and it may serve for a very long time before it requires a replacement while the comparatively small amount of fibers in the preliminary filter can be renewed at a low cost.

In the wine cellars where the wine is stored in casks, the vat may be carried on rollers so as to be brought readily when required into registry with the lower part of the desired cask.

The accompanying drawings illustrate by way of example a preferred embodiment of my invention. In said drawings:

FIGS. 3 and 4 illustrate two embodiments of a vat associated with such a preliminary filter.

FIGS. 1 and 2 illustrate the special structure of the short tubular upright enclosing the preliminary filter and surrounded by a chimney forming with it an annular container into which the wine is to be poured.

Figure 1:
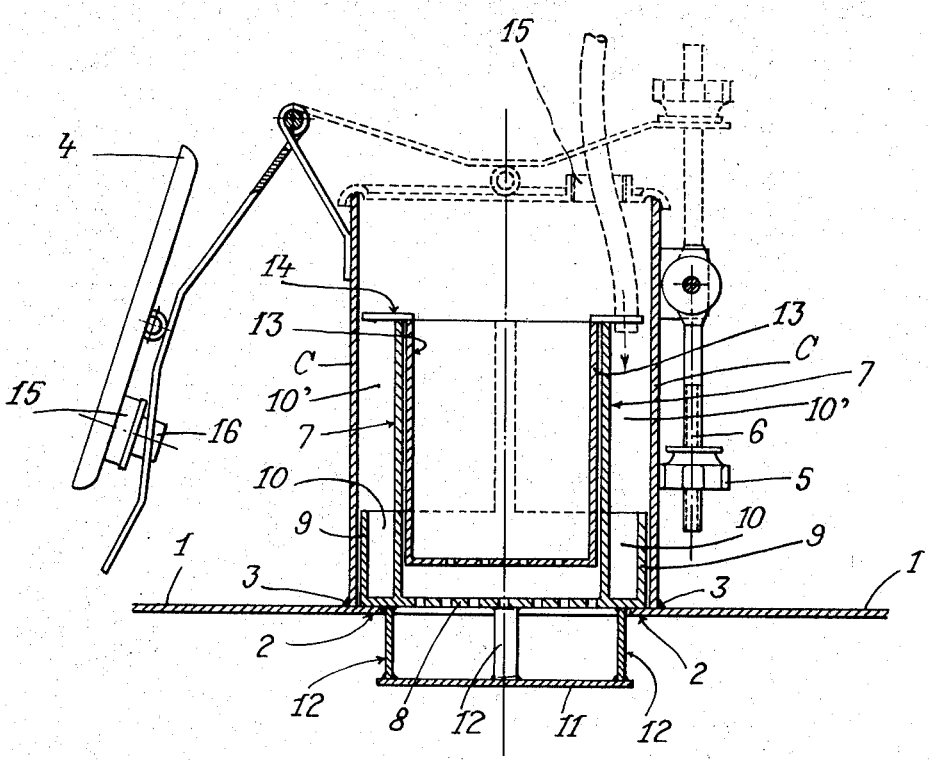
FIG. 1 is a vertical axial cross section of the preliminary filter.
Figure 2:
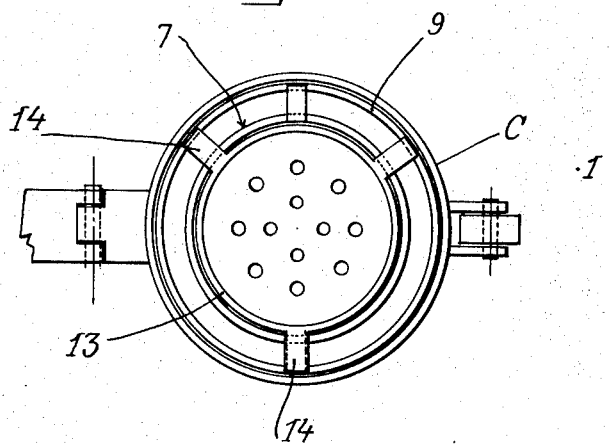
FIG. 2 is a plan view of said preliminary filter.

In FIGS. 1 and 2, 1 designate the cover of the vat and 2-2 the diametrically opposed edges of the circular opening formed in said cover. C designates the cylindrical chimney welded on the vat cover 1 along the line 3-3 coaxial with said opening in the vat. Said chimney is provided with a cover 4 the edge of which may be clamped over the upper edge of the chimney by a nut 5 carried by a threaded rod 6 pivotally secured to the chimney body in the usual manner whereby a fluidtight closure is provided for the chimney, said upright being closed at its lower end by a perforated bottom 8 projecting outwardly to form a flange, the outer edge of which is bent upwardly as shown at 9 so as to form round the lower end of the upright an annular trough 10 underneath which there is suspended to the upright bottom by means of depending rods 12 a solid plate 11 adapted to distribute peripherally into a sheet the liquid flowing out of the preliminary filter 13 housed in the tubular upright. Said upright 7 occupies only a fraction, for instance the two lower thirds, of the height of the chimney C and it encloses the preliminary filter 13 constituted by a removable metal basket provided with a perforated bottom rigid with outwardly projecting radial lugs 14 through which it rests over the upper edge of the upright 7.

Said basket 13 is filled with vegetable fibers and the wine to be filtered is poured through a hose or pipe passing through an opening K in the chimney cover 4 into the annular gap 10' between the chimney and the upright 7 so as to flow over the upper edge of the upright 7 and to drop into the basket 13 forming the preliminary filter; it flows thenafter out of the latter into the actual vat so as to subjected to the treatment in contact with the filtering fibers filling said vat. Since the system including the upright 7 and basket 13 is removable and may be taken out of the chimney and the lower plate 11 can pass easily through the opening 2-2 so as to be removed with the upright, the replacement of the fibers in the basket by fresh fibers is an extremely simple and speedy matter. Of course, the wine should be brought up to a level registering with the upper end of the chimney which is then closed by the cover 4, the opening 15 in which is closed in its turn by a threaded plug 16. It is apparent that the air into the vat is completely cut out since any bubbles of air which may be a carried along by the wine flowing out of the pipe feeding it, rise and are exhausted into the atmosphere during the passage of the wine out of the annular gap 10' into the filtering basket 13.

FIG. 3 illustrates in elevational, partly sectional view the arrangement of a vat of a substantial capacity associated with my improved preliminary filter. Said vat is provided at its lower end with a pipe threadedly engaged by a tap through which the wine can be drawn out, while a transparent vertical tube 17 branching off said pipe allows the level of the wine in the vat to be checked. Since the vat has a substantial diameter, the chimney C described hereinabove may also be given a diameter which is sufficient for the easy introduction therein of a filtering cushion.

In the case of small diameter vats, a chimney designed in the manner disclosed round the preliminary filtering upright may be difficult to set in position. In this case the same results as precedingly may be obtained by applying over the filtering mass filling substantially the entire capacity of the vat a heavy perforated plate P, as illustrated in FIG. 4, which plate is urged downwardly by a cover 18 providing a fluidtight closure for the filtering material, and carrying merely a removable tubular upright 7 containing the preliminary filtering fibers.

Of course, the arrangement forming the object of the invention and which consists in securing a preliminary filter within a tubular upright of a small diameter over the upper end of the vat may be incorporated with already extent vats, provided with a chimney or otherwise.

I claim:

1. In combination with a wine-treating vat including a cover provided with an opening and wherein the wine stays within a compressed mass of filtering vegetable fibers filling the vat completely, the arrangement comprising a short tubular upright fitted over the edge of the opening in the vat cover and opening into the vat, a perforated partition closing the lower end of said tubular upright and through which the wine is adapted to flow out of the upright into the vat, a mass of filtering fibers filling the upright above said partition and adapted to subject the wine to a preliminary filtering before it enters the vat and means for protecting the inside of the tubular upright against the action of atmospheric air.

2. An arrangement as claimed in claim 1 wherein the tubular upright is removably secured to the vat and includes a flange extending outwardly of its lower end and resting on the edge of the opening in the cover of the vat to allow a ready access into the vat.

3. An arrangement as claimed in claim 1 comprising a basket fitted removably inside the tubular upright, enclosing the mass of filtering fibers and including a perforated bottom extending over the perforated partition and radial lugs extending outwardly of the upper edge of the basket and resting on the upper edge of the tubular upright.

4. An arrangement as claimed in claim 1 wherein said means is a cylindric wall surrounding the tubular upright and the height of which is greater than that of the latter the lower end of said cylindrical wall being rigidly secured to the vat cover and forming with the upright an annular gap adapted to receive the wine which is to flow thence over the upper edge of the upright through the latter into the vat and a fluidtight closure for the upper end of the cylindrical wall, said closure forming the upright-protecting means.

5. An arrangement as claimed in claim 1 wherein said means is a cylindrical wall surrounding the upright and the height of which is greater than that of the latter; the lower end of said cylindrical wall being rigidly secured to the vat cover and forming with the upright an annular gap adapted to receive the wine which is to flow thence over the upper edge of the upright through the latter into the vat, a fluidtight cover for the upper end of the cylindrical wall, said closure forming the upright protecting means, and an annular trough closing the lower end of the gap between the upright and the cylindrical wall and rigid with the upright.